July 19, 1949.   E. H. SMITH   2,476,777
COMBINATION WELDING AND CUTTING TORCH
Filed Oct. 1, 1945
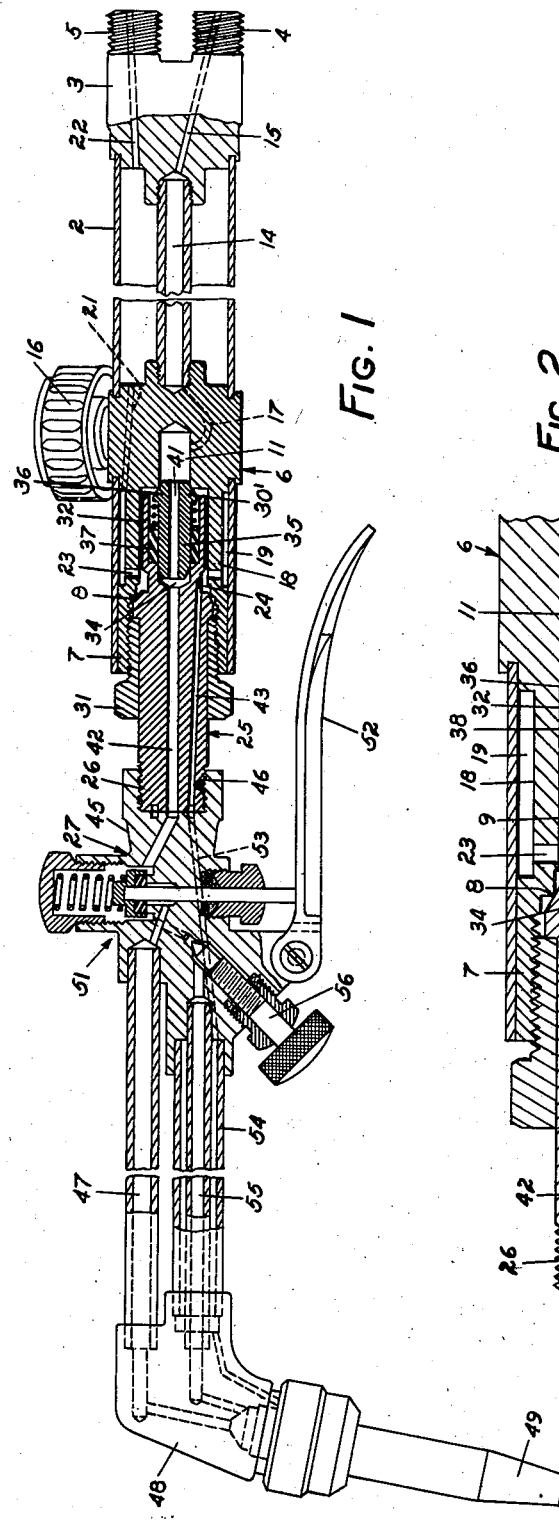
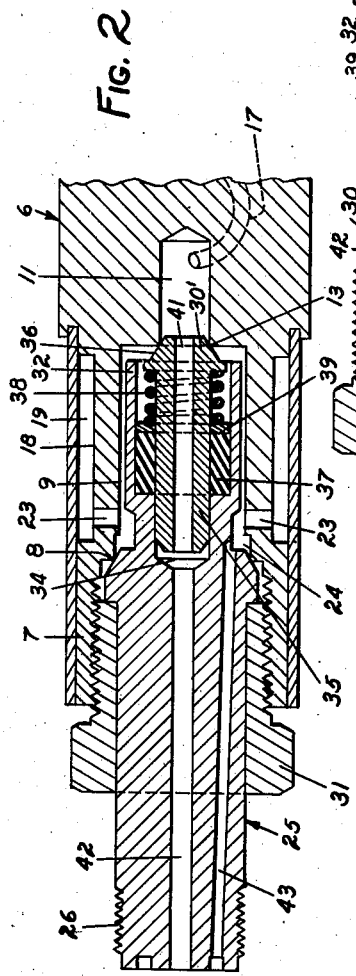
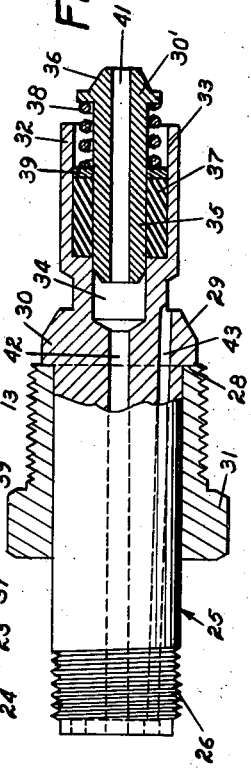
INVENTOR.
ELMER H. SMITH
BY
Paul, Paul & Moore
ATTORNEYS Patented July 19, 1949

2,476,777

UNITED STATES PATENT OFFICE 2,476,777

COMBINATION WELDING AND CUTTING TORCH

Elmer H. Smith, Minneapolis, Minn., assignor to Smith Welding Equipment Corporation, Minneapolis, Minn., a corporation of Minnesota Application October 1, 1945, Serial No. 619,607

8 Claims. (Cl. 158—27.4)

This invention relates to new and useful improvements in combination welding and cutting torches, and more particularly to the connecting means between the torch head and tip portion.

Combination welding and cutting torches, as is well known, utilize a suitable fuel gas and a high pressure oxygen, the latter being necessary to produce a cutting flame. In such combination torches two tip assemblies are selectively utilized, one being commonly referred to by the trade as a cutting assembly and the other as a welding tip. When the torch is to be used for cutting, the cutting assembly is used which requires a flow of high pressure oxygen to produce the necessary cutting flame. Means must therefore be provided for interchangeably securing the tip assemblies to the head of the torch body or handle in such a manner that there can be no danger of leakage between the fuel gas and oxygen passages of a cutting assembly, when such an assembly is being used, which heretofore has been a difficult problem.

It is therefore an object of the present invention to provide a combination welding and cutting torch provided with a novel coupling device for interchangeably securing the welding and cutting tips to the torch head, which device is so constructed as to positively prevent any leakage of the high-pressure oxygen into the fuel gas passages, when the torch is used as a cutting torch.

A further and more specific object is to provide a unique coupling device for detachably securing a tip to a torch head, which device comprises axially spaced faces adapted to engage axially disposed seats provided in the torch head, and one of said faces being axially movable relative to the other, thereby to assure that said faces will sealingly engage their respective seats, when the coupling device is secured in the torch head, and also whereby minor defects in machining of the parts will have little or no effect upon the sealing engagement of the spaced faces with their respective seats.

A further object is to provide a novel coupling device for interchangeably securing a welding or a cutting tip to a torch head, comprising a tubular body provided with an annular face adapted to engage a seat in the torch head, and said tubular body having an enlarged axial bore at one end terminating at its inner end in a relatively smaller bore forming a guide for a tubular member having a seat-engaging head at one end, and a compressible element encircling said tubular member within said enlarged bore and constantly urging it in a direction to increase the axial spacing between the face on said tubular body and the head of said tubular member, whereby when the coupling device is secured in the torch head, the head of said member will engage its seat before the face on said tubular body engages its seat, whereby the wall of said compressible element is expanded inwardly against the periphery of the tubular member and also outwardly against the wall of the enlarged bore, thereby to positively prevent leakage of high pressure gases between said parts.

A further object is to provide a combination welding and cutting torch comprising a coupling device for interchangeably securing a plurality of tips to a torch head, and which coupling device has a plurality of axially spaced faces adapted to sealingly engage a plurality of spaced seats provided in the torch head, and means being provided in connection with one of said faces for permitting axial movement thereof relative to the other face, thereby to assure positive leakproof engagements of said faces with their respective seats, when the tip assembly is secured to the torch head.

A further object is to provide a simple, inexpensive device for quickly securing or coupling a cutting assembly or a welding tip to a torch head, which device may be assembled as a complete unitary structure having means for quickly securing it to a tip assembly, and whereby tip assemblies provided with such devices may quickly be interchangeably secured to the torch head.

A further object is to provide in a torch of the class described, a multiplicity of gas tight seals so arranged and related to one another that when a tip assembly is secured in the torch head, said seals will positively prevent leakage between the high and low pressure gases passing through the torch head when the torch is in use, and said seals being so arranged as not to interfere with the insertion of the butt end of the tip assembly into the torch head, or its removal therefrom, whereby the use of the torch is greatly facilitated in that tip assemblies may be quickly interchangeably mounted in the torch head in a minimum of time.

Other objects reside in the simple and inexpensive construction of the invention which comprises few parts, the majority of which are cylindrical in form whereby the machining thereof presents a very simple operation; in the provision of a tubular cylindrical body adapted to be inserted into an outer enclosing member, as, for example a torch head, to provide therein a plurality of gas chambers and passages, and a plurality of axially spaced sealing faces being provided on said tubular body adapted to sealingly engage a plurality of seats arranged in fixed spaced relation in the enclosing member, and one of said sealing elements being relatively movable with respect to the other to effect positive sealing engagements of said sealing elements with their respective seats, thereby to prevent leakage between high and low pressure gases which may pass through said tubular body when the apparatus is in use.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a longitudinal sectional view of a conventional combination welding and cutting torch showing the invention embodied therein;

Figure 2 is an enlarged detail sectional view showing the coupling device in position in the torch head, with its spaced sealing faces in engagement with their respective seats; and Figure 3 is a view showing the coupling device removed from the torch tip and torch head to more clearly illustrate the relative axial movement of the tubular sealing member when the coupling device is removed from the torch head.

In the selected embodiment of the invention herein disclosed, there is illustrated in Figure 1, for purposes of disclosure, a more or less conventional combination welding and cutting torch comprising a suitable handle 2 having a butt piece 3 secured to one end. The butt piece is shown provided with threaded nipples 4 and 5 for connecting the handle to suitable supplies of fuel gas and oxygen, as is well known in the art.

A suitable head, generally designated by the numeral 6, is secured to the opposite end of the handle and has a threaded socket 7 provided at its bottom with an annular seat 8. A bore 9 extends inwardly from the seat 8, and a reduced bore 11 communicates with the bottom of the bore 9, as best illustrated in Figure 2. An annular seat 13 is provided at the open end of the bore 11. The bores 9 and 11 are axially aligned with the threaded socket 7.

The relatively smaller bore 11 provides a chamber for receiving high pressure cutting oxygen from a conduit 14 provided within the handle 2, as will be understood by reference to Figure 1. A small duct 15 connects one end of the tube 14 with the nipple 4 to which the oxygen supply conduit, not shown, is attached. An oxygen control valve, generally indicated by the numeral 16, is shown provided on the torch head 6 for controlling the flow of oxygen or other gas from the tube 14 to the chamber 11, through a valved passage, indicated in dotted lines at 17.

The main body of the valve head is annularly recessed, as shown at 18 to provided an annular chamber 19 into which the fuel gas is delivered from a duct 21, indicated in dotted lines in Figure 1. In other words, fuel gas is delivered into the tubular handle from the duct 22 and then passes from the handle through the passage 21 into the annular chamber 19, from whence it passes through radial ducts 23 into an annular chamber 24. A valve similar to the one indicated at 16 is provided on the torch head for regulating the flow of fuel gas or acetylene to the chambers 19 and 24. This valve is not shown in the drawings, as all of the above described mechanism is old and well known in the art.

An important feature of the present invention resides in the means provided for interchangeably securing welding and cutting tip assemblies to the torch head, whereby the torch may be used for either welding or cutting.

To thus interchangeably secure different tip assemblies to the torch head, a novel coupling means is provided which, as best shown in Figure 3, comprises a tubular cylindrical body 25 having one end threaded, as shown at 26, for securing it to a torch tip assembly, generally indicated by the numeral 27 in Figure 1.

To simplify explanation, the coupling means will hereinafter be referred to as a "coupling device." The body portion 25 of the coupling device is provided intermediately of its ends with an enlargement 30, one side of which constitutes a shoulder 28, and the opposite side of which is formed with a conical face 29. The face 29 is adapted to sealingly engage the seat 8, when the coupling device is secured to the torch head, as shown in Figure 2. A suitable securing nut 31 is mounted on the body 25 of the coupling device adapted to be received in the threaded socket 7 of the torch head, thereby to detachably secure the coupling device to the torch head.

The opposite end of the body 25 of the coupling device is shown provided with a cylindrical tubular portion 32 having an enlarged bore 33 terminating at its inner end in a reduced bore 34 which provides a guide for one end of a tubular sealing member 35. The opposite end of the member 35 is formed with a head 30, one side of which is formed with a conical face 36 adapted to engage the seat 13 in the torch head, when the coupling device is inserted therein and secured thereto by manipulation of the nut 31.

Another important feature of the invention resides in the compressible means associated with the sealing member 35, whereby said element is constantly urged in a direction towards the right, when viewed as shown in Figure 3, thereby to axially increase the spacing between the sealing faces 29 and 36, when the coupling device is removed from the torch head, as shown in Figure 3.

The compressible means above referred to is shown comprising a tubular packing element 37, preferably constructed of a suitable heat resistant rubber-like material having considerable resiliency, and which is snugly fitted onto the body of the sealing member 35, whereby it is slightly expanded to cause its periphery to engage the wall of the bore 33 with sufficient friction to retain the member 35 in the bore 33 and guide 34, when the coupling device is detached from the torch body, as shown in Figure 3.

A suitable spring 38 is shown coiled about the body of the sealing member 35 with one end engaging a washer 39 seated against the adjacent end of the rubber element 37. The opposite end of the spring 38 engages the head 30 of the member 35, whereby the spring 38 is under sufficient tension to outwardly move the sealing member 35 from the bore 33, as shown in Figure 3, assisted to some extent by the resiliency of the element 37, when the coupling device is detached from the torch head.

The sealing member 35 has an axial gas passage 41 which communicates at one end with the bore or chamber 11 of the torch head and its opposite end is in communication with a central passage 42 extending from the bottom of the guide bore 34 to the opposite end of the tubular body 25 of the coupling device. Another duct 43 is shown provided in the body 25 of the coupling device for conducting fuel or low pressure gas from the annular chamber 24 through the coupling device to the tip assembly, as will subsequently be described.

The tip assembly 27 shown in Figure 1 is commonly known in the trade as a cutting assembly, and is attached to the torch head when the torch is to be used as a cutting torch. The cutting assembly 27 is shown comprising a butt 45 having a threaded socket 46 for receiving the threaded end portion 26 of the body of the coupling device 25, as clearly illustrated in Figure 1. A cutting oxygen conduit 47 is interposed between the butt 45 and the torch head 48 for conducting high-pressure oxygen from the central passage 42 of the coupling device to the tip 49 through a suitable valve, generally indicated by the numeral 51, shown provided with a suitable operating lever 52. The fuel gas passes from the duct 43 in the coupling device through a duct 53 in the tip butt 45 to a tubular member 54 which conducts the fuel gas to the usual preheating orifices provided in the torch tip 49, not shown in the drawings.

The fuel mixture delivered to the preheating orifices is composed of measured quantities of fuel gas and oxygen, and oxygen is supplied thereto from a conduit 55, shown disposed within the tubular member 54 and which has one end communicating with a valve 56 for regulating the supply of oxygen to the tip. The cutting assembly is well known in the art and it is therefore thought unnecessary to further describe it in detail.

Another feature of the invention resides in enclosing the compressible element 37 within the tubular cylindrical end portion 32 of the body of the coupling device 25, whereby it cannot directly contact the wall of the relatively larger bore 9. It will also be noted by reference to Figures 1 and 2 that the outside diameter of the cylindrical portion 32 of the coupling device is slightly less than the diameter of the bore 9, whereby when it is desired to remove the cutting assembly from the torch head, after the securing nut 31 is unscrewed from the threaded socket 7 in the torch head, the coupling device may readily be withdrawn from the torch head, as the only parts thereof which directly contact the torch head when the nut 31 is detached therefrom, are the faces 29 and 36 of the body 25 and sealing member 35, respectively, assuming, of course, that the coupling device is retained in axial alignment with the torch head. It is not necessary to so retain the coupling device in the torch head when withdrawing it therefrom, as will be understood.

In Figure 3 the coupling device is shown independent of the cutting assembly 40 and torch head. When the coupling device is detached from the torch head, as shown in Figure 3, the spring 38, assisted by the resiliency of the element 37, will outwardly move the member 35, whereby the spacing between the conical face 36 of its head 30 and the valve face 29 of the coupling device is relatively greater than the distance between the fixed annular seats 8 and 13 in the torch head.

Thus, when the cutting assembly 27 to which the coupling device may be secured, is to be attached to a torch head, the cylindrical end portion 32 of the coupling device with the sealing member 35 positioned as shown in Figure 3, is inserted into the bore 9 of the torch head, whereupon the face 36 of the sealing member 35 will engage the seat 13 in advance of the face 29 engaging its seat 8.

The securing nut 31 is then tightened, whereupon the coupling device is forced into the torch head against the tension of the spring 38 and resiliency of the element 37, until the face 29 subsequently sealingly engages its seat 8. When this occurs, the face 36 of the sealing member 35 will be sealingly engaged with its seat 13, whereby leakage of the high pressure oxygen into the low pressure fuel gas is positively eliminated.

Thus, by the employment in a combination welding and cutting torch of the novel coupling device herein disclosed, it is impossible for leakage of high pressure gases to occur within the torch head, and, at the same time, the fit of the coupling device in the torch head is such that the particular tip assembly mounted in the torch head may readily and quickly be removed therefrom without any difficulty whatsoever.

It will also be noted that by mounting the sealing member 35 for relative axial movement with reference to the fixed valve face 29 slight variations in the spacing of the valve seats 8 and 13, as a result of defective machining, will have no effect upon the proper seating of the faces 29 and 36, as the spring 38 and resilient element 37 will compensate for any such variations in the spacing between the two sealing faces 29 and 36.

The resilient element 37 provided within the cylindrical end portion 32 of the coupling device is so fitted onto the cylindrical body of the sealing member 35 and into the bore 33, provided in the end portion 32, that when compressed therein, as shown in Figure 2, its wall is expanded in both inward and outward directions, thereby positively preventing leakage of high pressure gas from chamber 34 along the outside of member 35 and into chamber 24.

In the drawing I have shown the coupling device used for detachably securing a cutting assembly to a torch head. When securing a welding tip to the torch head, the coupling device may be dispensed with, because in the operation of a welding torch, the pressure of the oxygen delivered to the torch tip from the control valve 16 of the torch head may be reduced to substantially the pressure required at the end of the tip to provide the desired welding flame, whereby there is little danger of leakage between the various chambers and passages within the torch head. However, if desired, the welding tip or assembly may be provided with a coupling device, such as herein disclosed, whereby the means for connecting or coupling welding and cutting tip assemblies to a torch head may be identical in construction.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In an apparatus of the class described, a body having a chamber therein, means for delivering a pressure fluid to said chamber, a seat at one end of the chamber, a device having an enlarged axial bore, a tubular sealing member mounted in said bore with its periphery spaced from the wall of the bore to provide an annular packing space around the body of the sealing member, guide means in said bore for axially guiding the sealing member therein, said sealing member being adapted to engage said seat when the device is secured in position in said body, a compressible packing element in the annular space surrounding the tubular sealing member, and means for tightly compressing said compressible packing element in said annular space and urging the tubular sealing member into sealing engagement with said seat, thereby to prevent leakage of the pressure fluid from said chamber through the guide means supporting said tubular sealing member.

2. In an apparatus of the class described, a body having a chamber therein, means for delivering a high pressure gas to said chamber, a seat at one end of the chamber, a device having an enlarged axial bore, a tubular sealing member mounted within said bore with its periphery spaced from the wall of the bore to provide an annular packing space around the body of the sealing member, guide means in said bore for axially guiding the sealing member therein, said sealing member having a head at one end adapted to engage said seat when the device is secured in position in said body, a compressible packing element in the annular space surrounding the tubular sealing member, and spring means interposed between the compressible packing element and the head on said tubular sealing member adapted to compress said sealing element against the periphery of the body of said tubular sealing member and the wall of said enlarged bore, when the head of the sealing member is forced into sealing engagement with said seat, thereby to prevent leakage of gas from the chamber through the guide means supporting said tubular sealing member.

3. In a device of the class described, a member having a low pressure chamber therein terminating at its inner end in a reduced pressure chamber provided at its open end with an annular seat, a body having a cylindrical end portion inserted into said low pressure chamber, said cylindrical end portion having an enlarged axial bore terminating at its inner end in a reduced guide bore, a sealing member mounted for axial movement in said enlarged bore and having one end guidingly supported in said guide bore, the diameter of said sealing member being substantially less than the diameter of said enlarged bore to provide an annular space between the periphery of the sealing member and the wall of the enlarged bore, the opposite end of said sealing member being adapted to sealingly engage said seat, a gas passage in said sealing member having one end in communication with the high pressure chamber, a compressible packing element interposed in the annular space surrounding the sealing member, and means for compressing said packing element in said annular space and constantly urging said sealing member into sealing engagement with its seat.

4. In a device of the class described, a member having a low pressure chamber therein terminating at its inner end in a reduced pressure chamber provided at its open end with an annular seat, a body having a cylindrical end portion inserted into the enlarged chamber, said cylindrical end portion having an enlarged axial bore terminating at its inner end in a reduced guide bore, a sealing member mounted for axial movement in said enlarged bore and having one end guidingly supported in said guide bore, the diameter of said sealing member being substantially less than the diameter of said enlarged bore to provide an annular space between the periphery of the sealing member and the wall of the enlarged bore, the opposite end of said sealing member having a head formed thereon adapted to sealingly engage said seat, a gas passage in said sealing member having one end in communication with the high pressure chamber, a compressible element interposed in the annular space surrounding the sealing member, and spring means interposed between said compressible element and the head of the sealing member adapted to exert a yielding force on the compressible element, when the head of the sealing member engages its seat, thereby to compress said element against the walls of said annular space to prevent leakage of gas from the high pressure chamber into the low pressure chamber.

5. In a device of the class described, an outer enclosing member having axially aligned bores therein of different diameters, each bore having a seat at one end, means for supplying low pressure gas to the larger bore and high pressure gas to the smaller bore, a body received in said enclosing member and having spaced sealing faces for engaging said seats, and means on said body cooperating with said bores to provide axially aligned low and high pressure gas chambers, one of said sealing faces being axially movable with respect to the other to assure positive sealing engagement of said faces with their respective seats, thereby to prevent leakage of gas from the high pressure chamber into the low pressure chamber.

6. In a device of the class described, an outer enclosing member having axially aligned bores therein of different diameters, each bore having a seat at one end, means for supplying low pressure gas to the larger bore and high pressure gas to the smaller bore, a body received in said enclosing member and having spaced sealing faces for engaging said seats, means on said body cooperating with said bores to provide axially aligned low and high pressure gas chambers, one of said sealing faces being axially movable with respect to the other, and resilient means constantly exerting a force on said movable face to retain it in sealing engagement with its seat, thereby to prevent leakage from the high pressure chamber into the low pressure chamber.

7. In a torch of the class described, a handle portion and a tip assembly, a head having one end secured to the handle portion and provided at its opposite end with a socket, an enlarged bore at the bottom of said socket, an annular seat at the juncture between the socket and said bore, a relatively smaller bore communicating at one end with said larger bore, and an annular seat at the open end of the smaller bore, means for supplying a fuel gas to the larger bore and separate means for supplying high pressure oxygen to the smaller bore, and a coupling device secured to the tip assembly for detachably securing the tip assembly to the torch head, whereby the tip portion may be supplied with fuel gas and oxygen from the torch head and handle portion, said coupling device comprising axially spaced sealing faces adapted to engage said seats, and means mounting one of said sealing faces for relative axial movement on the coupling member, whereby said faces may sealingly engage their respective seats independently of one another, thereby to prevent leakage of high-pressure oxygen into the fuel gas passage.

8. In a torch of the class described, a handle portion and a tip assembly, a head secured to one end of the handle and having an axial bore therein, a relatively smaller bore in communication with the bottom of the larger bore and axially aligned therewith, a seat at the open end of each bore disposed in fixed spaced relation, means for supplying fuel gas and high-pressure oxygen respectively to said larger and smaller bores, and a coupling device for detachably securing the tip assembly to the torch head, said coupling device comprising axially spaced sealing faces adapted to engage said seats to prevent leakage of the high pressure gas from the smaller bore into the larger bore, and one of said sealing faces being axially movable with respect to the other to assure seal-tight engagements of said sealing faces with their respective seats.

ELMER H. SMITH.

REFERENCES CITED

The following references are of record in the file of this patent:

UNITED STATES PATENTS

| Number | Name | Date |
|---|---|---|
| 1,549,420 | Hofstetter | Aug. 11, 1925 |
| 1,592,973 | Fausek, et al. | July 20, 1926 |
| 2,109,251 | Jacobsson | Feb. 22, 1938 |
| 2,164,972 | Wagner | July 4, 1939 |
| 2,176,813 | Hammon | Oct. 17, 1939 |

FOREIGN PATENTS

| Number | Country | Date |
|---|---|---|
| 506,504 | Great Britain | May 30, 1939 |